United States Patent [19]

Lee et al.

[11] Patent Number: 4,555,562

[45] Date of Patent: * Nov. 26, 1985

[54] POLYURETHANE ELASTOMER COMPOSITION

[75] Inventors: Fui-Tseng H. Lee, Princeton; Joseph Green, East Brunswick, both of N.J.

[73] Assignee: FMC Corporation, Philadelphia, Pa.

[*] Notice: The portion of the term of this patent subsequent to Jun. 26, 2001 has been disclaimed.

[21] Appl. No.: 584,021

[22] Filed: Feb. 27, 1984

Related U.S. Application Data

[63] Continuation-in-part of Ser. No. 476,163, Mar. 17, 1983.

[51] Int. Cl.$^4$ ............................................. C08G 18/38
[52] U.S. Cl. ........................................ 528/72; 521/108; 521/168; 528/60; 528/127
[58] Field of Search ............... 528/72, 60; 525/127; 521/108, 168

[56] References Cited

U.S. PATENT DOCUMENTS

| | | | |
|---|---|---|---|
| 3,445,405 | 5/1969 | Vogt | 260/2.5 |
| 3,513,113 | 5/1970 | Praetzel et al. | 260/2.5 |
| 3,591,532 | 7/1971 | Abercrombie et al. | 521/51 |
| 3,897,398 | 7/1975 | Beninate et al. | 528/72 |
| 3,925,265 | 12/1975 | Lin | 521/168 |
| 4,343,914 | 8/1982 | Lee | 521/168 |
| 4,456,743 | 6/1984 | Lee et al. | 528/60 |

*Primary Examiner*—Herbert S. Cockeram
*Attorney, Agent, or Firm*—Robert D. Jackson; Eugene G. Horsky

[57] ABSTRACT

A polyurethane elastomer product formed by curing a mixture of an NCO terminated urethane prepolymer and a polyhydroxyalkylphosphine oxide. The polyhydroxyalkyl phosphine curative is a compound of the class having the formula:

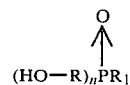

wherein R is alkylene of 3 to 6 carbon atoms, $R_1$ is alkyl of 2 to 10 carbon atoms, cycloalkyl of 6 to 12 carbon atoms and n is an integer of 2 to 3. Exemplary polyhydroxyalkyl phosphine curatives are $(HOCH_2CH_2CH_2)_2P(O)—C_4H_9$—sec. and $(HOCH_2CH_2CH_2)_3P(O)$.

5 Claims, No Drawings

POLYURETHANE ELASTOMER COMPOSITION

This is a continuation-in-part of application Ser. No. 476,163, filed Mar. 17, 1983.

This invention relates to polyurethanes, particularly to improved polyurethane elastomer compositions and their preparation.

Polyurethanes comprise a well-known class of commercial polymers, the characteristic structural unit of which is the urethane linkage, $$-\overset{H}{N}-C(O)O-.$$

Broadly, such polymers are produced by condensing a polyisocyanate with a multifunctional hydrogen donor such as an organic polyol, commonly a polyester or polyether having free hydroxy groups. Both cellular and solid forms of the polymer can be obtained, depending on the choice of reaction conditions. To produce cellular or, what is more familiarly referred to as polyurethane foam, the so-called "one shot" process is normally employed. In this procedure, all of the ingredients are combined simultaneously in the presence of a blowing agent and the resultant mixture transferred to a mold or form and allowed to foam up and solidify. Flexible foams are obtained by including as one of the components, a small quantity of water which hydrolyzes some of the isocyanate to generate carbon dioxide which acts as the blowing agent; rigid foams are produced using halogenated hydrocarbons as the blowing agent. Non-cellular polyurethanes are normally made without a blowing agent. In the "prepolymer" or two-component method of manufacturing non-cellular polyurethanes, the technique with which the invention is generally concerned, an excess of polyisocyanate is first reacted with the polyol to form an intermediate prepolymer. The latter is then contacted with an active hydrogen compound—commonly referred to as a curative—which reacts with residual NCO groups to engender a solid polyurethane system. Amines and hydroxy compounds are the usual curatives. An outline of polyurethane chemistry is set forth in the following scheme:

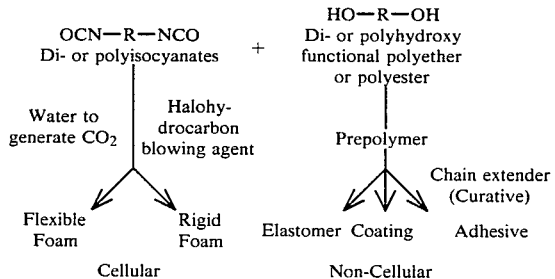

By varying R, for example, aliphatic or aromatic, the molecular and/or equivalent weight of the reactants, functionality of active hydrogen donors, for example, polyols and curatives as well as the nature of other minor though important ingredients such as catalysts, surfactants and the like, a large variety of products having widely differing properties can be realized.

One important line of polyurethane products and one with which the present invention is particularly concerned, is the elastomers. These are substantially linear polyurethanes having varying degrees of rubberlike properties. They are usually formed by reacting excess diisocyanate with linear long-chain polyols, such as a polyether or polyester, and curing the resulting NCO terminated prepolymer with a low molecular weight diamine, diol, triol or their admixtures.

In the manufacture of polyurethane elastomers made by the prepolymer or two-component method, one of the standard curatives for toluene diisocyanate (TDI) based prepolymers is MOCA, the acronym for the name of the difunctional amine 4,4'-methylene-bis(2-chloroaniline). However, because of possible carcinogenicity, the production and availability of MOCA has been considerably curtailed. Other amine curatives have been used such as Polacure 740M (trimethylene glycol di-p-amino benzoate).

It is also known to produce polyurethane elastomers using low molecular weight polyhydroxy compounds as curatives. An example of such curatives, particularly for commercial purposes, is a blend, by weight, of 6% trimethylolpropane (TMP) and 94% 1,4-butanediol (BD). Although generally satisfactory as a curative for MDI based prepolymers, (TMP) (BD) gives soft, very low strength elastomers with TDI prepolymers compared to corresponding MOCA cured polymers. Other curatives which have been reported include mixtures of 1,4-butanediol and butynediol for RIM injection molded polyurethane elastomers and hydroquinone di-(beta hydroxyethyl)ether (HQEE) for sheet molded polyurethane elastomers (SMUC).

It has now been discovered that polyurethane elastomers having superior mechanical properties can be produced by curing an NCO terminated prepolymer derived from a polyhydroxy polyether or polyester or mixtures in which the curative contains a polyhydroxyalkylphosphine oxide of the formula:

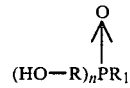

wherein R is alkylene of 3 to 6 carbon atoms, $R_1$ is an alkyl of 2 to 10 carbon atoms, cycloalkyl of 6 to 12 carbon atoms and n is an integer of 2 or 3.

In carrying out the invention, polyurethane elastomers are prepared generally in the known manner except that the herein polyhydroxyalkylphosphine oxides are used in place of the prior art curatives. Typically, the NCO prepolymer and the curative are each degassed at 80° C., mixed together and cured at about 100° C.; post curing is usually at about 70° C.

The prepolymers employed in the practice of the invention are known chemical entities, the description and preparation of which are extensively documented in treatises dealing with urethane elastomer technology. Such intermediates are obtained by condensing an excess of an organic diisocyanate or polyisocyanate with various polyhydroxy-containing polyesters and polyethers. The percentage of NCO available in the resulting isocyanate terminated prepolymer will vary with the amount of excess isocyanate employed. Solvent-free prepolymers are commonly made up at an available NCO percentage of about 3% to 20%. In the well-known treatise "The Development and Use of Polyurethane Products" by E. N. Doyle (McGraw-Hill Book Company) at page 35, the characteristics of some prepolymers derived from polyfunctional polyethers and polyesters in which the diisocyanate is TDI are as follows:

1. TDI/polyester, with 2.5 equivalent weight excess TDI, with the polyester having an equivalent weight of 810 (lightly branched polyethylene succinate).
2. TDI/polyether, with 2.5 excess TDI, with the polyether having an equivalent weight of 325 (polyether diol).
3. TDI/polyether, with 2.5 TDI, with the polyether having an equivalent weight of 980 (polyoxypropylene triol).
4. TDI/polybutadiene homopolymer, with 3.0 excess TDI. The equivalent weight of the homopolymer is 1,150.
5. TDI plus 0.75 equivalent weight of polyester with equivalent weight of 280, plus 0.25 equivalent weight polyether, with an equivalent weight of 960. 3.0 excess TDI was used. The polyester was propylene fumarate and the polyether a diol.
6. TDI plus 0.75 equivalent weight of polyoxypropylene glycol triol, with an equivalent weight of 1,000, plus 0.25 equivalent weight hydroxy ethyl acrylate. 2.5 excess TDI was used. The hydroxy ethyl acrylate had an equivalent weight of 116.
7. TDI plus 0.75 equivalent weight of polyoxypropylene glycol (same as in No. 6) plus 0.25 equivalent weight sorbitol. Excess TDI was 3.0.

Exemplary phosphine oxides within the ambit of the formula aforesaid include:

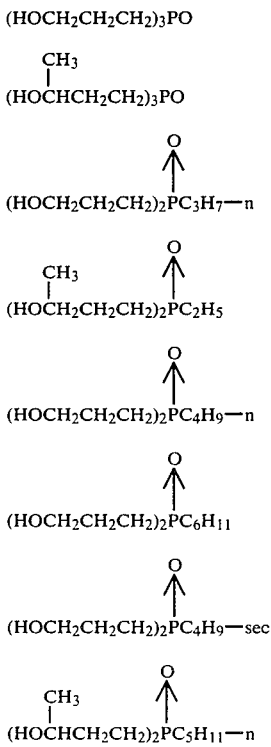

Polyhydroxyalkylphosphine oxides are a known class of chemical compounds which are described in the technical literature. They may be prepared by first forming the intermediate phosphine by reacting an excess of an olefinic compound with a phosphine compound in the presence of a free radical catalyst. The phosphine adduct is then contacted with an oxidizing agent such as hydrogen peroxide to give the phosphine oxide. Generally speaking, polyhydroxyalkylphosphine oxides are hydrolytically very stable.

| Name | Reactants Description | Supplier |
|---|---|---|
| C-200[1] | Liquid diol Eq. wt. = 111 | FMC Corporation |
| C-300[2] | Solid triol, mp = 106° C. Eq. wt. = 75 | FMC Corporation |
| Curene ® 422 | 4,4'-methylene-bis (2-chloroaniline)-MOCA | Anderson Development Company |
| Vibrathane ® 8011 | Polyester/TDI based prepolymer, 3.34% NCO | Uniroyal Chemical |
| Vibrathane ® 6004 | Polyester/TDI based prepolymer, 4.4% NCO | Uniroyal Chemical |
| Vibrathane ® 602 | Polyether/TDI based prepolymer, 3.32% NCO | Uniroyal Chemical |
| Isonol ® 93 | Liquid triol Eq. wt. = 90 | Upjohn |

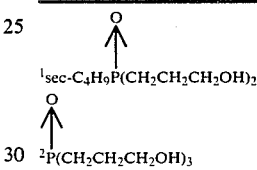

[1] sec-$C_4H_9P(CH_2CH_2CH_2OH)_2$ with $P=O$

[2] $P(CH_2CH_2CH_2OH)_3$ with $P=O$

Preparation of Elastomers

A mixture containing 67% of C-200 and 33% of C-300 was prepared by heating and mixing 28 grams of C-300 and 72 grams of C-200 (contains 7% triol) in a beaker at about 100° C. until a clear solution was obtained. Other blends were prepared similarly.

Tensile sheets and compression buttons were prepared according to generally known procedures. Curatives were used at 95% theory for all examples and the amounts needed per 100 parts prepolymer were determined using the following equation:

Amount of C-200/C-300 required =

$$\frac{\text{wt. of prepolymer} \times \% \text{ NCO in prepolymer}}{42 \times 100} \times \text{Avg. Eq. Wt. of Curatives} \times 0.95$$

The prepolymer and the curative blend were each degassed at 80° C. in a vacuum oven for 30 to 60 minutes to remove entrapped air. The curative was added and hand mixed for one minute. The resulting mix was again degassed for one minute and then poured into heated 6"×6" molds. All tensile sheets were 75 mil thick unless indicated otherwise. Compression buttons were prepared similarly.

Seventy grams of prepolymer were found to be a convenient sample size. Pot-life of these materials was 4 to 8 minutes after the addition of curatives. The polymer samples were cured at 212° F. for the time specified in the examples. All samples were post-cured for 16 hours at 158° F. and conditioned at room temperature and 50% RH for one week prior to physical measurements.

Test Methods

The procedures described in the following ASTM test methods were used to determine various physical properties for the prepared elastomer samples.

| | |
|---|---|
| Tensile, Elongation, Modulus | ASTM D412 Type A and D pulled at 20 in./min. |
| Hardness | ASTM D2240 |
| Tear Strength | ASTM D624 - Die C D470. ASTM D470 - Split |
| Compression Set | ASTM D395 - Method B |
| Resilience, Bashore | ASTM D2632 |

Examples prepared in accordance with the procedures aforesaid are set forth in Tables I-III.

Table I shows the curing conditions and physical properties of the cured polymers using a polyester/TDI-based prepolymer, Vibrathane ®8011, and three C-200/C-300 blends as curing agents. Example No. 1 has the lowest level of triol content, that is, 8%, Example No. 2 has 15% triol and Example No. 3 has 33% triol. Example No. 4 is cured with Isonol ®93 (a triol); the data are taken from the Vibrathane product literature and is included in Table I for comparison. Examples No. 1, 2 and 3 all gave very rapid cure at 212° F. and were ready for demolding within 30 minutes. Isonol ®93, on the other hand, required 16 hours at the same temperature. In terms of Shore A hardness, examples cured with C-200/C-300 are slightly harder, 63–65 versus 57. More interesting and surprising differences were obtained in 100% and 300% modulus and especially in tensile strength at break. Examples cured with C-200/C-300 had lower moduli and higher tensiles. Examples No. 2 and 3 had tensile strengths of 5513 and >5040 psi, respectively, which were significantly higher than Isonol ®93 cured, Example No. 4. This example had a tensile strength of 3500 psi and 460% elongation. All three C-200/C-300 cured examples had much greater elongations, 700% or greater. Tear strength (Die C) and compression set properties for examples No. 1–3 were not much different from those expected of polyol cured polyester/TDI polymers. It appears that Example No. 2 with 15% of C-300 gave the toughest polymer. At 742% elongation (Instron limit) the tensile strength was 5040 psi; none of the five tested tensile specimens had broken. ASTM D412 Type D die cut outs from 0.025 inch thick tensile sheets were used.

Table II shows elastomers made from a polyether/TDI prepolymer, Vibrathane ®6004, cured with C-200/C-300, Curene ®442 (a MOCA equivalent) and their mixtures. Examples No. 5 and 6 have, respectively, 33 and 15% of triol C-300. Example No. 7 was cured using a mixture containing 50% Curene ®442, 17% C-300 and 33% C-200. Example No. 8 was prepared using Curene ®442 alone. Attempts to prepare Isonol ®93 cured example with Vibrathane ®6004 prepolymer for comparison purposes were not successful. Samples failed to cure at 212° F. after 16 hours and longer. With C-200/C-300 and/or Curene ®442 as curing agents all examples, except No. 6 which had only 15% of triol C-300, cured after one hour at 212° F. Example No. 6 required two hours for tensile sheets and three hours for compression buttons. Again, examples cured with C-200/C-300 curatives showed medium-high hardness, that is, 66 Shore A. As expected, the diamine cured example had much higher physical properties than those cured with C-200/C-300. In Example No. 7, the hardness increased to 72 when one-half of the hydroxy curatives was replaced with Curene ®442. Interestingly, Example No. 7, which was cured with an equal mixture of diamine and hydroxy curatives, did not have significantly higher physicals than Example No. 6, using only hydroxy curatives. In fact, both tensiles at break and elongation are slightly lower in Example No. 7.

In Table III, Example 9 shows elastomers prepared from a polyether/TDI-based prepolymer, Vibrathane ®602 and curatives C-200 and C-300. The curative blend contained 33% of triol and 67% diol. Again the curing was very fast, 10 to 15 minutes at 212° F. Moduli at 100, 300 and 500% were not much different from data shown in Tables I and II of polyester based polymers. The tensile at 690% elongation was 3240 psi which is higher than obtained from Vibrathane ®6004 and lower than that of cured Vibrathane ®8011. Split tear strength (D470) for the cured Vibrathane ®602 was 25 lb/in. A split tear strength of 13 lb/in. was reported for Adiprene L-100 (polyether/TDI based prepolymer, %NCO=4.10±0.20, from DuPont) cured with a mixture of 1,4-butanediol and TMP.

C-200 (diol) and C-300 (triol) were found to be useful as curatives for castable urethane elastomers. As curatives, these materials offer unique properties which are not usually obtained from either diamine or conventional polyol curatives. In terms of reactivity, they are about as reactive as MOCA and thus offer fast curing for TDI capped prepolymers. In terms of physical properties, they give products of intermediate hardness (65 Shore A), tensile strength similar to the MOCA cure and elongation and modulus similar to the polyol cure. Data also showed that improvements in split tear (D470) can also be expected. This is an unusual combination of properties. Further developmental work is underway which will undoubtedly shed much light on the full usefulness of these new materials. The rapid cure obtainable with these curatives may also be of interest for RIM application.

TABLE I

| Urethane Elastomers Prepared From Prepolymer Vibrathane ® 8011 and Curatives C-200 and C-300 | | | | |
|---|---|---|---|---|
| Example No. | 1 | 2 | 3 | 4 |
| Vibrathane ® 8011 | 100 | 100 | 100 | 100 |
| Curatives, 95% Theory | | | | |
| Parts Per 100 | 8.0 | 8.21 | 8.20 | Isonol ® 93 |
| C-200/C-300, % ratio | 92/833 | 67/33 | 85/16 | — |
| Cure Time at 212° F. | | | | |
| Tensile sheets, minutes | 20 | 20 | 20 | 16 hrs. |
| Compression buttons minutes | 30 | 30 | 30 | — |
| Urethane Properties | | | | |
| Hardness, Shore A | 63 | 65 | 63 | 57 |
| Modulus, psi | | | | |
| 100% | 157 | 152 | 156 | 260 |
| 300% | 250 | 305 | 270 | 550 |
| 500% | 470 | 899 | 644 | — |
| Tensile, psi | 3677 | 5513 | >5040[2] | 3500 |
| Elongation, % | 768 | 682 | >742[2] | 460 |
| Tear Strength | | | | |
| Die C, pli | 90 | 150 | 120 | — |
| D470 pli | — | — | — | 17 |
| Compression Set | | | | |
| 22 hours/158° F. Method B, % | 41 | 22 | 12 | — |

TABLE I-continued

Urethane Elastomers Prepared From Prepolymer Vibrathane ® 8011 and Curatives C-200 and C-300

| Example No. | 1 | 2 | 3 | 4 |
|---|---|---|---|---|
| Bashore Rebound, % | 38 | 32 | 38 | — |

[1] Data for Isonol ® 93 from Vibrathane ® 8011 Product Data Sheet, Uniroyal Chemical, Division of Uniroyal, Inc. Naugatuch, Conn. 06770.
[2] Samples did not break in Instron tester.

TABLE II

Urethane Elastomers Prepared From Prepolymer Vibrathane ® 6004 and Curatives C-200 and C-300

| Example No. | 5 | 6 | 7 | 8 |
|---|---|---|---|---|
| Vibrathane ® 6004 | 100 | 100 | 100 | 100 |
| Curatives, 95% Theory | | | | |
| Parts Per 100 | 11.26 | 11.25 | 11.71 | 13.43 |
| C-200, % | 67 | 85 | 33 | 0 |
| C-300, % | 33 | 15 | 17 | 0 |
| Curene 442, 180 | 0 | 0 | 50 | 100 |
| Cure Time at 212° F. | | | | |
| Tensile sheets, Hrs. | 1.0 | 2.0 | 1.0 | 1.0 |
| Buttons, Hrs. | 1.0 | 3.0 | 1.0 | 1.0 |
| Urethane Properties | | | | |
| Hardness, Shore A | 67 | 66 | 72 | 86 |
| Modulus, psi | | | | |
| 100% | 190 | 224 | 286 | 646 |
| 200% | — | — | 391 | 843 |
| 300% | 445 | 304 | 530 | 1167 |
| 500% | 1359 | 811 | — | — |
| Tensile, psi | 2808 | 1904 | 2258 | 4009 |
| Elongation, % | 596 | 658 | 523 | 506 |
| Tear strength Die C, pli | 181 | 154 | 180 | 370 |
| Compression Set | | | | |
| 22 Hrs/158° F. Method B | 37 | 39 | — | 45 |
| Bashore Rebound, % | 38 | 37 | — | 35 |

TABLE III

Urethane Elastomers Prepared From Prepolymer Vibrathane ® 602 and Curatives C-200 and C-300

| Example 9 | |
|---|---|
| Vibrathane ® 602 | 100 |
| Curatives, 95% Theory | |
| Parts Per 100 | 8.11 |
| C-200/C-300 % ratio | 67/33 |
| Cure Time at 212° F. | |
| Tensile sheets, minutes | 10 |
| Compression buttons, minutes | 15 |
| Urethane Properties | |
| Hardness, Shore A | 61 |
| Modulus, psi | |
| 100% | 170 |
| 300% | 250 |
| 500% | 460 |
| Tensile, psi | 3240 |
| Elongation, % | 690 |
| Tear Strength, | |
| Die C, pli | 106 |
| D470, pli | 25 |
| Compression Set | |
| 22 Hours at 158° F. Method B, % | 25 |
| Bashore Rebound, % | 50 |

What is claimed is:

1. A polyurethane elastomer product of an NCO terminated elastomer prepolymer formed from a polyol selected from the class consisting of dihydroxy functional polyethers and polyesters cured with a mixture of polyhydroxyalkyl phosphine oxides of the formula:

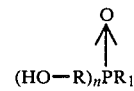

wherein R is alkylene of 3 to 6 carbon atoms, $R_1$ is alkyl of 2 to 10 carbon atoms, cycloalkyl of 6 to 12 carbon atoms and n is an integer of 2 to 3, it being provided that the said mixture contains a minor amount of the phosphine oxide wherein n is 3 and a major amount of the phosphine oxide wherein n is 2.

2. The elastomer product of claim 1 wherein the NCO terminated prepolymer is formed by reacting the polyol with toluene diisocyanate.

3. The elastomer product of claim 1 wherein the NCO terminated prepolymer is formed by reacting the polyol with 4,4'-diphenylmethanediisocyanate.

4. The elastomer product of claim 1 wherein the curative is a mixture of a major amount of:

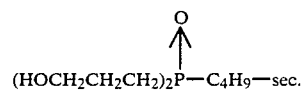

and a minor amount of:

5. The elastomer of claim 1 wherein the curative is the compound:

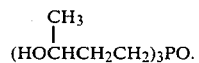

* * * * *